(12) United States Patent
Faraotti et al.

(10) Patent No.: US 8,209,295 B2
(45) Date of Patent: Jun. 26, 2012

(54) STORING INFORMATION WITH A DESCRIPTION LOGIC FILE SYSTEM

(75) Inventors: Alessandro Faraotti, Rome (IT); Berardino Salvatore, Silvi Marina (IT)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/273,658

(22) Filed: Nov. 19, 2008

(65) Prior Publication Data
US 2009/0132604 A1   May 21, 2009

(30) Foreign Application Priority Data
Nov. 19, 2007   (EP) .................................... 07120957

(51) Int. Cl.
*G06F 17/30* (2006.01)
(52) U.S. Cl. ........ 707/665; 707/649; 707/661; 707/791; 707/802
(58) Field of Classification Search .................. 707/100, 707/101, 200, 201, 205, 661, 665, 791, 802, 707/825
See application file for complete search history.

(56) References Cited

U.S. PATENT DOCUMENTS

| | | | |
|---|---|---|---|
| 6,266,682 B1 | 7/2001 | LaMarca | |
| 6,745,206 B2 | 6/2004 | Mandler | |
| 7,043,472 B2 | 5/2006 | Aridor et al. | |
| 7,149,729 B2 | 12/2006 | Kaasten | |
| 7,424,701 B2 * | 9/2008 | Kendall et al. | 717/105 |
| 7,505,989 B2 * | 3/2009 | Gardner et al. | 707/999.01 |
| 7,680,813 B2 * | 3/2010 | Ushijima | 707/999.102 |
| 7,739,218 B2 * | 6/2010 | Arguello et al. | 706/61 |
| 7,823,123 B2 * | 10/2010 | Sabbouh | 717/106 |
| 2005/0055380 A1 | 3/2005 | Thompson et al. | |
| 2008/0104032 A1 * | 5/2008 | Sarkar | 707/3 |

FOREIGN PATENT DOCUMENTS

WO   2006036127 A   4/2006

OTHER PUBLICATIONS

Gifford, David K.; "Semantic File Systems"; 13th ACM Symposium on Operating System Principals; Oct. 1991; 10 pages; MIT Laboratory for Computer Science; Massachusetts Institute of Technology; USA.
Written Opinion, International Searching Authority.

* cited by examiner

*Primary Examiner* — Tim T Vo
*Assistant Examiner* — Dangelino Gortayo
(74) *Attorney, Agent, or Firm* — Dambrosio & Menon, PLLC; Usha Menon; Srikant Viswanadham

(57) ABSTRACT

Methods, systems, and products for storing information in a data processing system. The method includes providing a knowledge base for a file system manager that is adapted to organize a plurality of real files on a mass memory of the data processing system. The knowledge base defines a collection of knowledge that includes a set of concepts, a set of relations among the concepts, and a set of relations of inclusion that describe each real file as an instance of at least one concept. The method includes detecting a command for the file system manager for accessing a set of selected instances. The method also includes identifying a set of selected real files, which are described by the selected instances (according to the knowledge), and accessing the selected real files on the mass memory.

15 Claims, 11 Drawing Sheets

STORING INFORMATION WITH A DESCRIPTION LOGIC FILE SYSTEM

PRIORITY

This application is based on and claims the benefit of priority from European Patent Application No. EP07120957, filed Nov. 19, 2007.

BACKGROUND

A data processing system, such as a computer, is commonly used to store large amounts of information. Typically, the information is arranged in files with each file consisting of a block of information stored on a mass memory of the computer. The block of information may be individually accessed by a user.

The files are organized in a file system, which is controlled by an operating system of the computer. Substantially all the file systems known in the art have a hierarchical structure. Particularly, the files are included in containers which are often generally referred to as folders or directories. The folders are then linked in a tree, starting from a root folder defining a physical or logical device of the computer.

The file system facilitates the logical management of the files on the computer. Indeed, first of all a name of each file provides some sort of information about its characteristics. Moreover, all the files in a particular folder are likely to share common characteristics defining a corresponding category in some way identified by a name of the folder. Different levels of categories for the files may also be defined by the hierarchy of the folders. For example, it is possible to have a folder for all the customers, with further folders depending thereon for specific customers, each one including all the files relating to a corresponding customer with each file storing a specific communication with the customer.

In this scheme, the characteristics of the files may only be defined in a completely informal manner (according to the names of the files and the folders). Therefore, this information generally cannot be leveraged by software applications. Moreover, the organization of the files in the folders, once a specific hierarchy has been selected, is quite rigid and difficult to change. Particularly, each file belongs to a single folder.

It is possible to create a link to the same file into other folders. However, this mechanism only allows adding further characteristics to the file (according to the names of the other folders), breaks the concept of uniqueness of the files and makes the organization of the files very difficult to manage.

SUMMARY

Generally, embodiments of the invention include applying an ontology to a file system to allow expressing relations among the files. More specifically, aspects of the present disclosure include methods, systems, and products for storing information in a data processing system. The method begins by providing a knowledge base for a file system manager. The file system manager is adapted to organize a plurality of real files on a mass memory of the data processing system. The knowledge base defines a collection of knowledge that includes a set of concepts, a set of relations among the concepts, and a set of relations of inclusion that describe each real file as an instance of at least one concept according to a predefined ontology. The method also includes detecting a command for the file system manager for accessing a set of selected instances. For example, the command may be submitted through a graphical representation of corresponding virtual folders and files. The method also includes identifying a set of selected real files described by the selected instances according to the knowledge, and accessing the selected real files on the mass memory.

In some embodiments, the method may also include inferring further knowledge from the knowledge by applying predefined logical inference rules; and identifying further selected files according to the further knowledge. The method may include accessing real files according to the further knowledge.

In some embodiments, the method may also include detecting a further command for the file system manager for manipulating a set of further selected instances. The method may also include updating the knowledge according to the further command.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
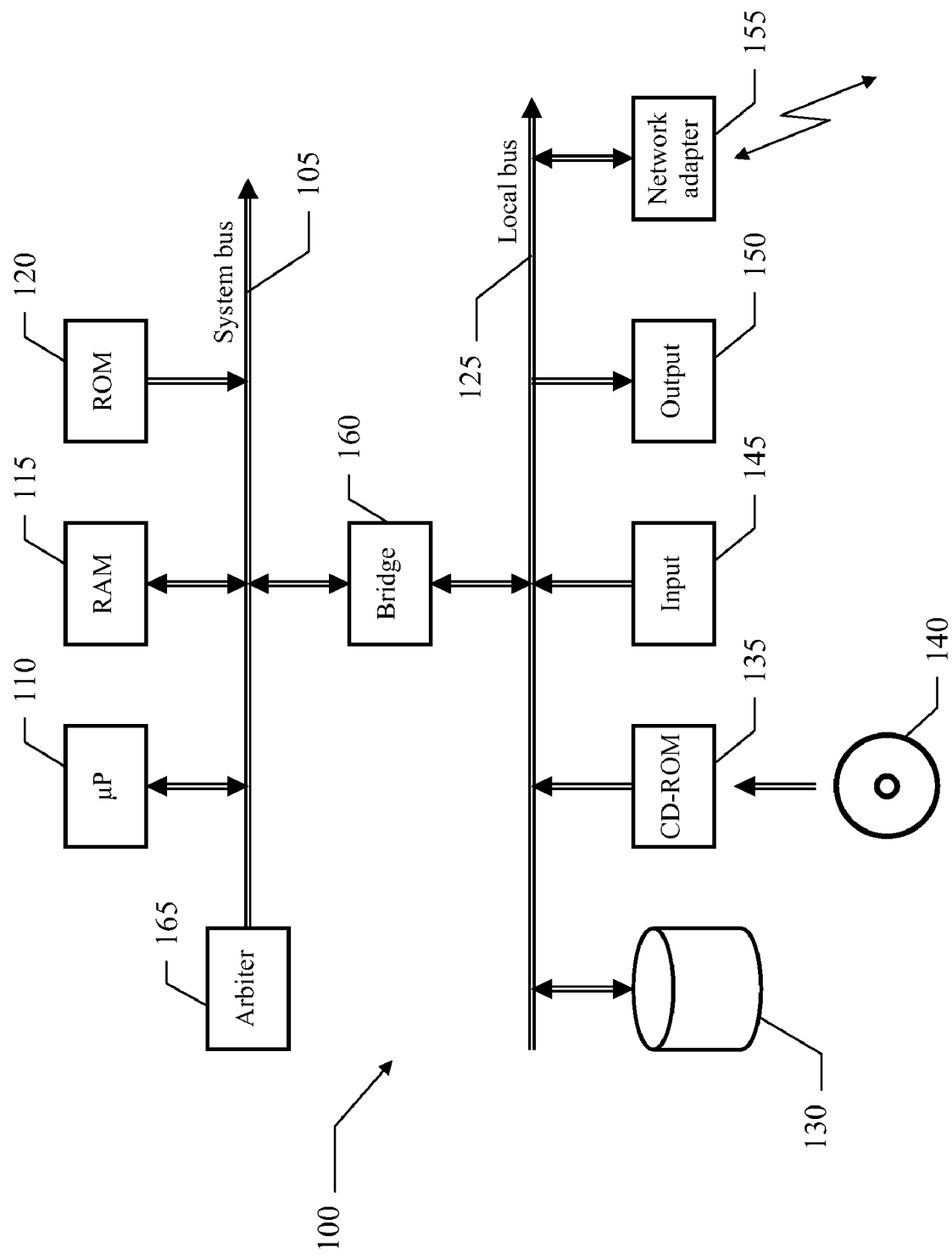
FIG. 1 is a block diagram of a computer for storing information in a data processing system according to an embodiment of the invention.

With reference in particular to FIG. 1, a schematic block diagram of a computer 100 (for example, a PC) is illustrated. The computer 100 is formed by several units that are connected in parallel to a system bus 105. In detail, one or more microprocessors ($\mu$P) 110 control operation of the computer 100; a RAM 115 is directly used as a working memory by the microprocessors 110, and a ROM 120 stores basic code for a bootstrap of the computer 100. Several peripheral units are clustered around a local bus 125 through respective interfaces. Particularly, a mass memory consists of one or more hard-disks 130 and drives 135 for reading CD-ROMs 140. Moreover, the computer 100 includes input units 145 (for example, a keyboard and a mouse), and output units 150 (for example, a monitor and a printer). An adapter 155 is used to connect the computer 100 to a network (not shown in the figure). A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

The computer 100 implements a file system, which is used to organize files stored on its mass memory 130,140 (for eventual access by a user of the computer 100). In one embodiment, the file system is based on an ontology. The ontology is a formal specification for describing a semantic of generic entities of a domain of interest (i.e., their meaning in an unambiguous way). The entities that can be described according to the ontology define a universe of discourse of the domain. Generally, the ontology is based on a conceptualization, which provides an abstract view of the entities (simplified by ignoring their details, so as to capture same sort of commonality among them), which entities can then be described with concrete data structures conforming to the ontology.

Most ontologies define instances, concepts, attributes and relations. The instances consist of the concrete things (either tangible or intangible), which are to the described as a final goal of any ontology (for example, the instance "MyCar" of a specific car). The concepts are abstract collections of instances (for example, the concept "Car" for all the cars). Attributes are pieces of information (generally in the form of pairs name/value), which are used to specify the instances or concepts to which they are applied (for example, the attribute "Color=Red" for the instance "MyCar", or the attribute "NumberOfWeels=4" for the concept "Car"). The relations may associate one or more source terms to one or more target terms. In some embodiments, one relation type is the relation "is-a", which specifies that a source instance/concept is included in a target concept. The relation "is-a" allows defining a particular ontology (known as taxonomy), which may be used to classify the instances into categories defined by corresponding concepts. The taxonomy may have a hierarchical structure, wherein the concepts are organized into a tree structure by the relations "is-a"—with child concepts (including corresponding instances) that are included in parent concepts up to a root concept of the tree (for example, a concept "Vehicle" that includes the concepts "Bike" and "Car").

Facts (i.e., clauses that should always be true) consisting of the definition of specific concepts or of the assertion of specific relations (describing actual entities according to the ontology) define the knowledge on the domain, which is collected in a knowledge base. The knowledge base differs from a standard database, since in this case further knowledge may be derived from the existing knowledge by a reasoning based on logical inference. The logical inference is the process of obtaining new facts from available facts by applying logical inference rules (which define how the available facts are to be combined to obtain the new facts).

The knowledge base may be expressed (according to the ontology) by different formal languages. Exemplary types of formal languages that may be used are the Description Logic (DL) languages, which derive their name from the application of a logic-based semantic. The syntax of each DL language may be defined by terms including instance names, concept names, role names, attribute names, constructors, intentional assertions and extensional assertions. The instance names represent instances, the concepts names represent concepts (with a standard concept "Top" formed by all the instances, and a standard concept "Bottom" with no instances), the role names represent relations, and the attribute names represent attributes. The constructors (such as intersection, union, negation, inverse, and the like) are used to combine simpler terms (concept names or role names) into more complex terms.

For example, the constructor "Car ∃hasFoldingRoof" defines the concept of "ConvertibleCar" as the cars (included in the concept "Car") that have a folding roof (attribute "hasFoldingRoof" asserted). The intensional assertions express relations among concepts; for example, the intensional assertion "Car is-a Vehicle" specifies that the concept "Car" is included in the concept "Vehicle". At the end, the extensional assertions express relations among instances and other instances, concepts or roles; for example, the extensional assertion "MyCar belongsTo MyPerson" specifies that the instance "MyCar" is used by the instance "MyPerson", and the extensional assertion "MyCar is-a Car" specifies that the instance "MyCar" is included in the concept "Car". Conventionally, a DL language distinguishes a Terminological Box (TBox) and an Assertional Box (ABox). The TBox substantially represents the conceptualization of the desired entities (i.e., a sort of schema of the data); for this purpose, the TBox includes the concepts, the roles, the attributes, and the intensional assertions. On the other hand, the ABox substantially represents the entities that actually manifest this conceptualization (i.e. the data itself); for this purpose, the ABox includes the instances and the extensional assertions. This distinction is not significant, but it facilitates the definition and the management of the knowledge base that is expressed with the DL language.

According to an embodiment of the invention, the file system is described with a knowledge base, which defines a collection of knowledge conforming to a predefined ontology; more specifically, the knowledge includes concepts, relations among the concepts, and relations of inclusion describing each file as an instance of one or more concepts. For each command that is submitted to a file system manager for accessing a set of selected instances, corresponding selected files described by the selected instances are identified according to the knowledge; these selected files can then be accessed on the mass memory. The proposed solution allows defining the semantic of the files in a formal way and then without ambiguities (according to the ontology). Moreover, this allows implementing sophisticated semantic reasoning on the file system.

In one embodiment, aspects of the present invention are embedded in the file system itself, which then directly manifests an intelligent behavior. This capability of the file system may be exploited by the user (which benefits of an automatic classification of the files according to the concepts wherein the corresponding instances are included). The same capability may also be leveraged by software applications out-of-the-box.

Figure 2A:
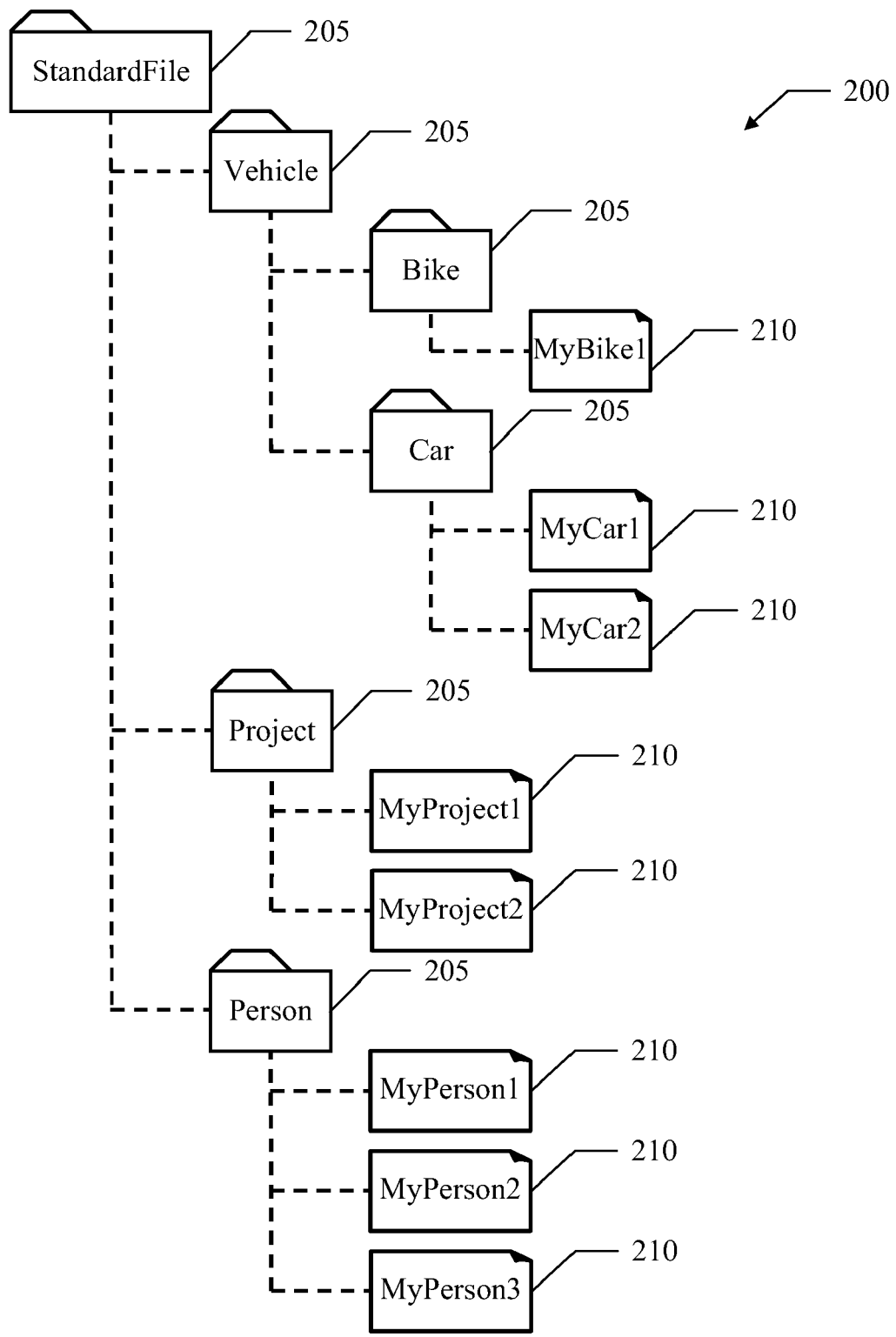
FIGS. 2A-2B show file structures according to an embodiment of the invention.
Figure 2B:
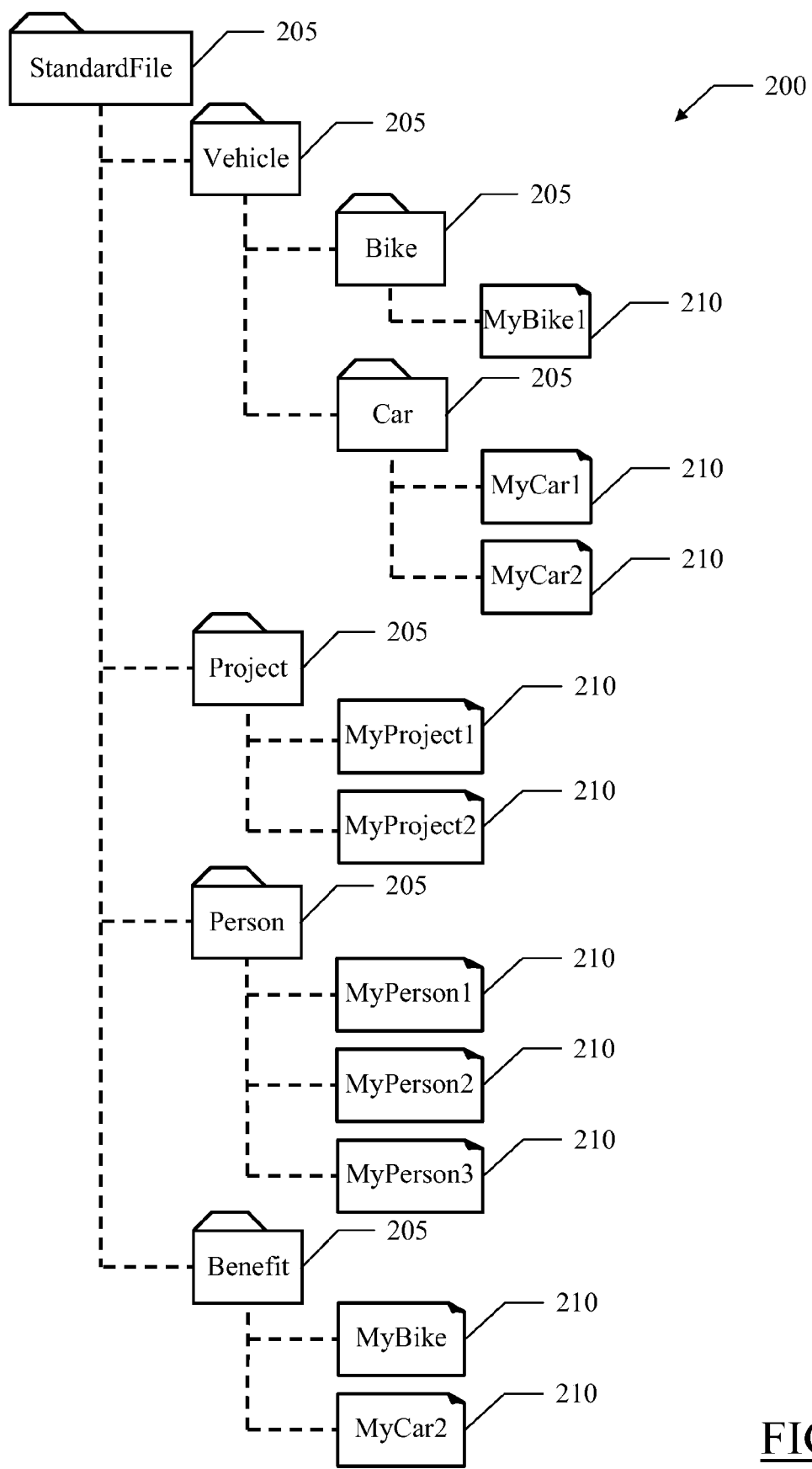

FIGS. 2A-2B show file structures according to an embodiment of the invention. Moving now to FIG. 2A, in one embodiment of the invention, the knowledge base is expressed with a DL language. The choice of a particular DL language can permit a good tradeoff between the opposed requirements of descriptive capability and reasoning complexity. However, aspects of the invention may be implemented in any particular DL language.

Particularly, the TBox includes the standard concepts "Top" and "Bottom", and a concept "StandardFile" for all the files. The user can then define further custom concepts (included in the concept "StandardFile"), roles, attributes, and intensional assertions. The user can then define the ABox with extensional assertions describing each file stored on the mass memory of the computer as an instance of one or more concepts together with any desired corresponding relations. In some implementations, all the files may be described as an instance of at least the concept "StandardFile".

For example, as shown in the FIG. 2A, the knowledge base may define a hierarchical taxonomy, which is represented graphically with a tree 200. More specifically, each concept is represented with a virtual folder 205, and each instance is represented with a virtual file 210; hereinafter, for the sake of simplicity, each virtual folder 205 and each virtual file 210 will be denoted with the same name of the corresponding concept and instance, respectively. As pointed out above, each virtual file 210 describes a real file that is stored on the mass memory of the computer; the real file is identified unambiguously by a corresponding identifier consisting of, for example, a Universally Unique Identifier (UUID). The virtual folders 205 are instead completely independent of any real folder that may possibly be used to organize the real files oh the mass memory of the computer (even if nothing prevents using corresponding real folders for the first instance of each real file that is added to the knowledge base).

The tree 200 starts from the (root) virtual folder "StandardFile" (for all the real files). The user may define the organization of a company archive, for example, with a concept "Vehicle" for all the vehicles asserting that "Vehicle is-a StardardFile", a concept "Bike" for all the bikes asserting that "Bike is-a Vehicle", a concept "Car" for all the cars asserting that "Car is-a Vehicle", a concept "Project" for all the projects asserting that "Project is-a StardardFile", and a concept "Person" for all the persons asserting that "Person is-a StardardFile". The user further asserts that "Car ∃Bike=Bottom" (i.e. no cars can be a bike and no bikes can be a car).

At this point, the user defines an instance "MyBike1" of the concept "Bike" (assertion "MyBike1 is-a Bike"), two instances "MyCar1" and "MyCar2" of the concept "Car" (assertions "MyCar1 is-a Car" and "MyCar2 is-a Car"), two instances "MyProject1" and "MyProject2" of the concept "Project" (assertions "MyProject1 is-a Project" and "MyProject2 is-a Project"), and three instances "MyPerson1", "MyPerson2" and "MyPerson3" of the concept "Person" (assertions "MyPerson1 is-a Person", "MyPerson2 is-a Person", and "MyPerson3 is-a Person"). The instances "MyBike1", "MyCar1" and "MyCar2" may describe real files storing information about the corresponding bikes and cars (such as their plate number, mechanical characteristics, age, and the like). The instances "MyProject1" and "MyProject2" may describe real files storing information about the corresponding projects (such as their scheduling, status, and the like), while the instances "MyPerson1", "MyPerson2" and "MyPerson3" may describe real files storing information about the corresponding persons (such as their name, telephone number, and the like). The user can also assert any desired relation among the instances. For example, it is possible to assert that "MyBike1 belongsTo MyPerson1", "MyCar2 belongsTo MyPerson3", "MyProject1 belongsTo MyPerson2", and "MyProject2 belongsTo MyPerson3".

The resulting knowledge base is represented in the tree 200 with the virtual folder "StandardFile" as a root thereof. The virtual folders "Vehicle", "Project" and "Person" are appended to the virtual folder "StandardFile", and the virtual folders "Bike" and "Car" are appended to the virtual folder "Vehicle". The virtual file "MyBike1", the virtual files "MyCar1" and "MyCar2", the virtual files "MyProject1" and "MyProject2", and the virtual files "MyPerson1", "MyPerson2" and "MyPerson3" are appended to the virtual folders "Bike", "Car", "Project" and "Person", respectively.

The management of the virtual folders 205 and virtual files 210 in the proposed file system is made with commands that are as similar as possible to the ones typically supported by standard file systems. In this way, the devised solution is completely opaque to users and to software applications that do not leverage it. However, further commands are available to implement additional operations specifically tailored to the proposed organization of the file system based on the knowledge base.

Particularly, the user can access each virtual file 210 (and then the corresponding real file on the mass memory of the computer) as usual by any path that reaches the virtual file 210 from a generic virtual folder 205 to which it is appended. For example, "StandardFile/Vehicle/Car/MyCar1",
"Vehicle/Car/MyCar1",
"Car/MyCar1", and
"MyCar1"

are all valid paths for the virtual file "MyCar1" (identified by its UUID).

However, the user can now also access the virtual files 210 according to further knowledge that is inferred (by applying logical inference rules) from the knowledge base. For example, as shown in FIG. 2B, the user adds a new concept "Benefit" for the vehicles that are used by the persons ("Benefit is-a Vehicle AND Vehicle belongsTo Person"). In this case, it is possible to infer that the instance "MyBike 1" (used by the instance "MyPerson1") and the instance "MyCar2" (used by the instance "MyPerson3") are included in the concept "Benefit". This is represented in the tree 200 by the virtual folder "Benefit" that is appended to the virtual folder "StandardFile", with the virtual files "MyBike1" and "MyCar2" that are appended to the virtual folder "Benefit". It should be noted that this result is achieved automatically by applying a reasoning on the knowledge base, without the need of explicitly asserting that the instances "MyBike1" and "MyCar2" are included in the concept "Benefit". In this way, it is possible to discover implicit relations between the instances (and the corresponding real files). Moreover, this allows performing semantic queries on the file system.

Figure 3A:
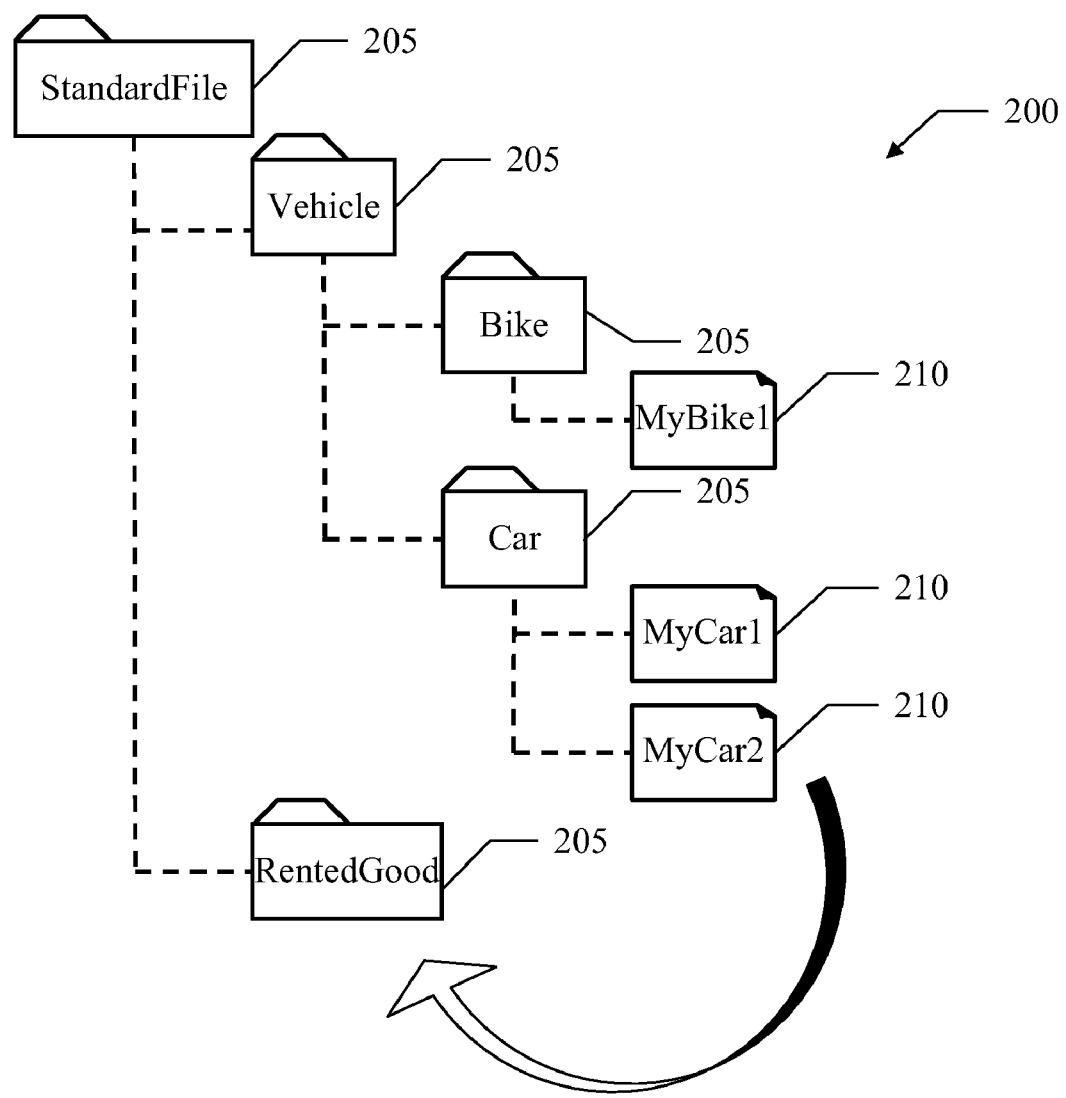
FIGS. 3A-3E show file structures according to an embodiment of the invention.

The virtual folders 205 and the virtual files 210 may also be manipulated with standard commands (such as copy, move, delete, and the like), which are automatically translated into the corresponding updates to the knowledge base and to the real files (if it is necessary). FIGS. 3A-3E show file structures according to an embodiment of the invention. For example, FIG. 3A shows a portion of the same tree 200 as in FIG. 2A (limited to the virtual folders "StandardFile", "Vehicle", "Bike" and "Car" with the corresponding virtual files "MyBike1"; "MyCar1" and "MyCar2"). In this case, the user creates a new virtual folder 205 for a concept "RentedGood" (for all the goods that are rented by the company). The user then copies the virtual file "MyCar2" into the virtual folder "RentedGood" (for example, by a drag-and-drop with the mouse—as represented by an arrow in the figure), to indicate that the corresponding car has been rented.

Figure 3B:
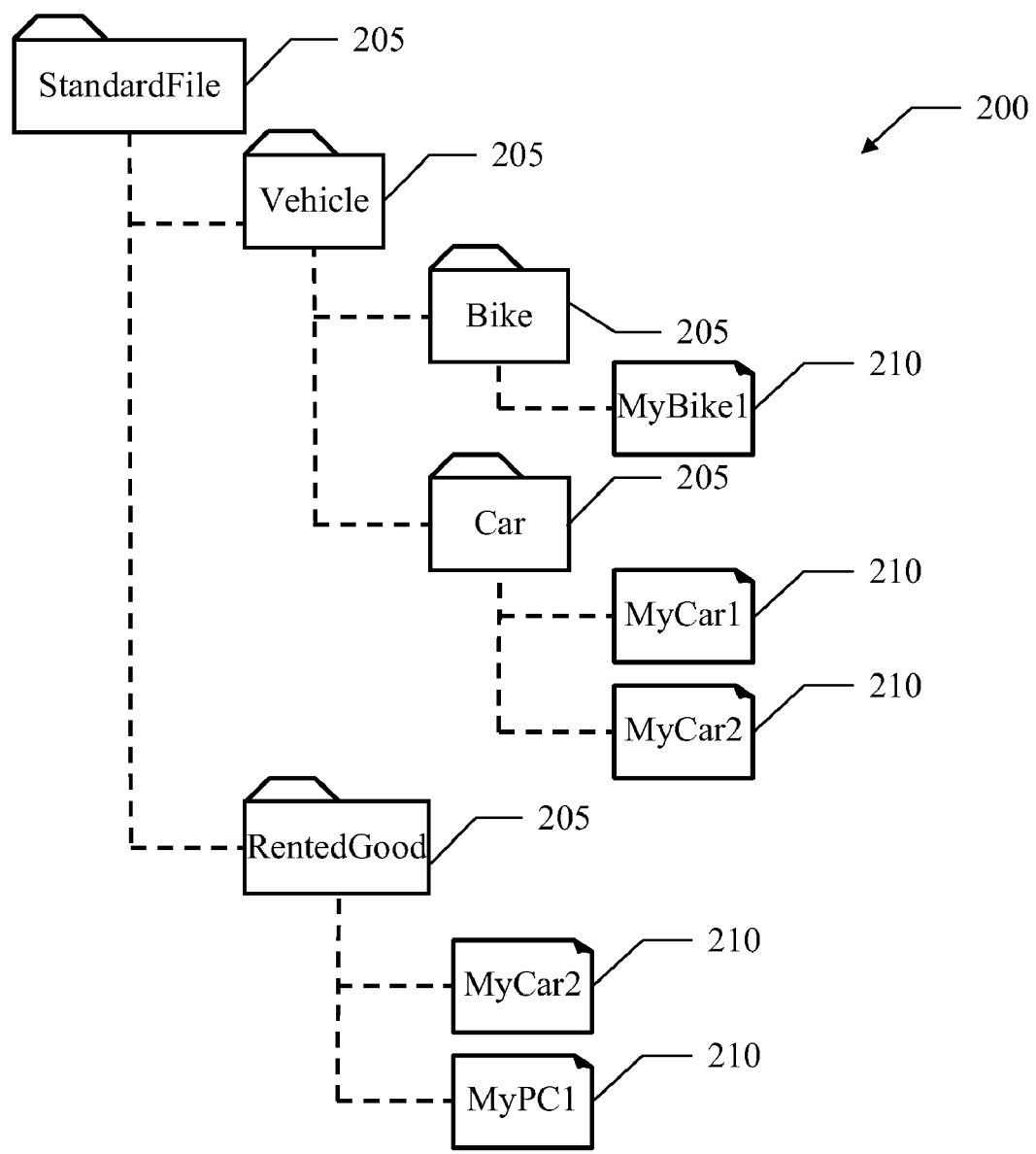

Moving to FIG. 3B, as a result a new assertion "MyCar2 is-a RentedGood" is added to the knowledge base automatically. This is represented in the tree 200 with a further virtual file "MyCar2" that is appended to the virtual folder "RentedGood". The user then creates a new real file storing information about a PC that is rented by the company, and represents it with a new virtual file "MyPC1" that is appended to the same virtual folder "RentedGood". As above, a new corresponding instance "MyPC1" with the assertion "MyPC1 is-a RentedGood" is added to the knowledge base automatically.

Figure 3C:
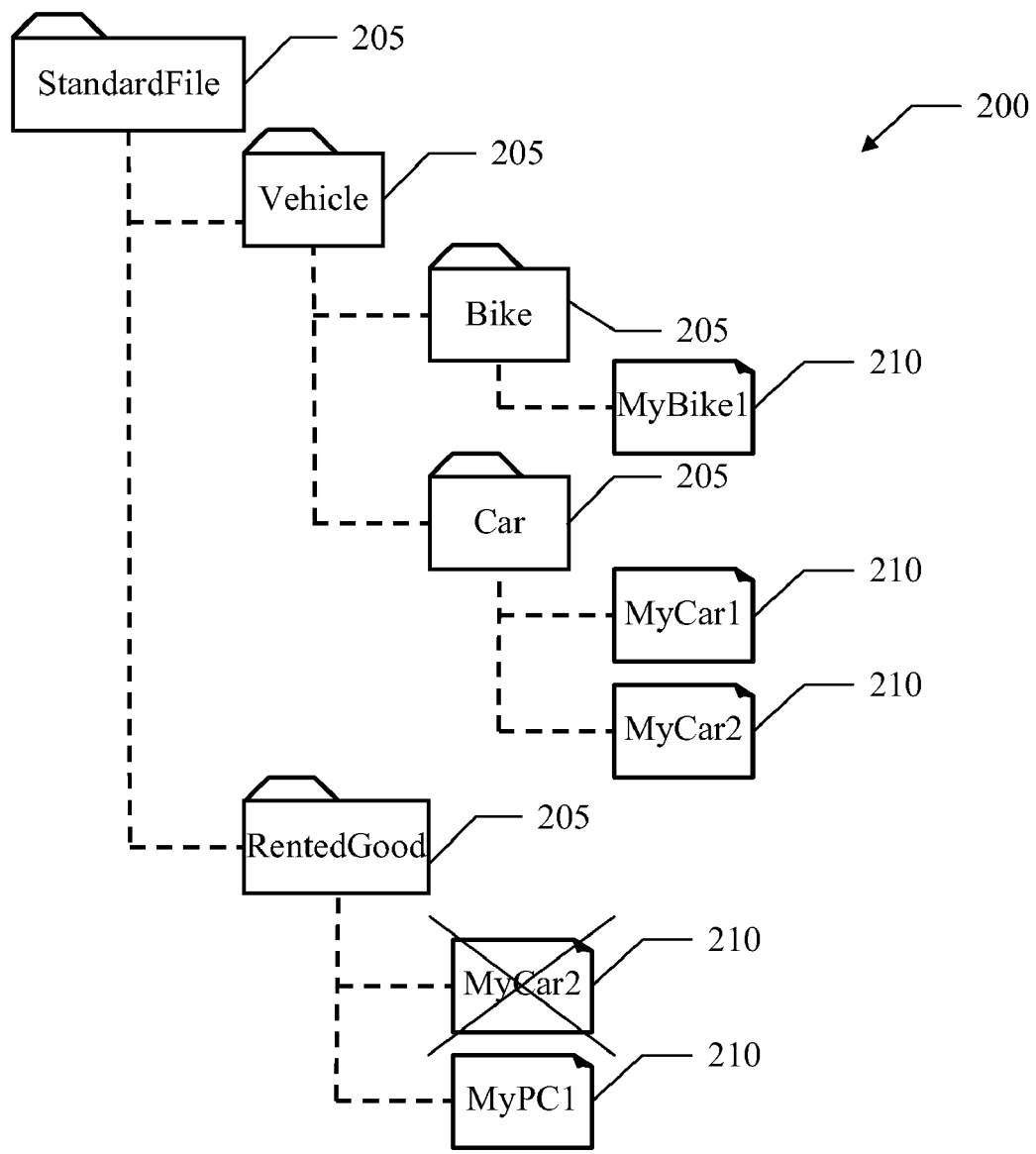

With reference now to FIG. 3C, the user decides to delete the virtual file "MyCar2" from the virtual folder "RentedGood" (as indicated with a cross in the figure). The delete operation may be performed either in a weak mode or in a strong mode (for example, by selecting corresponding commands in a pop-up menu that is opened when the user clicks on any-virtual file 210 with the right button of the mouse).

Figure 3D:
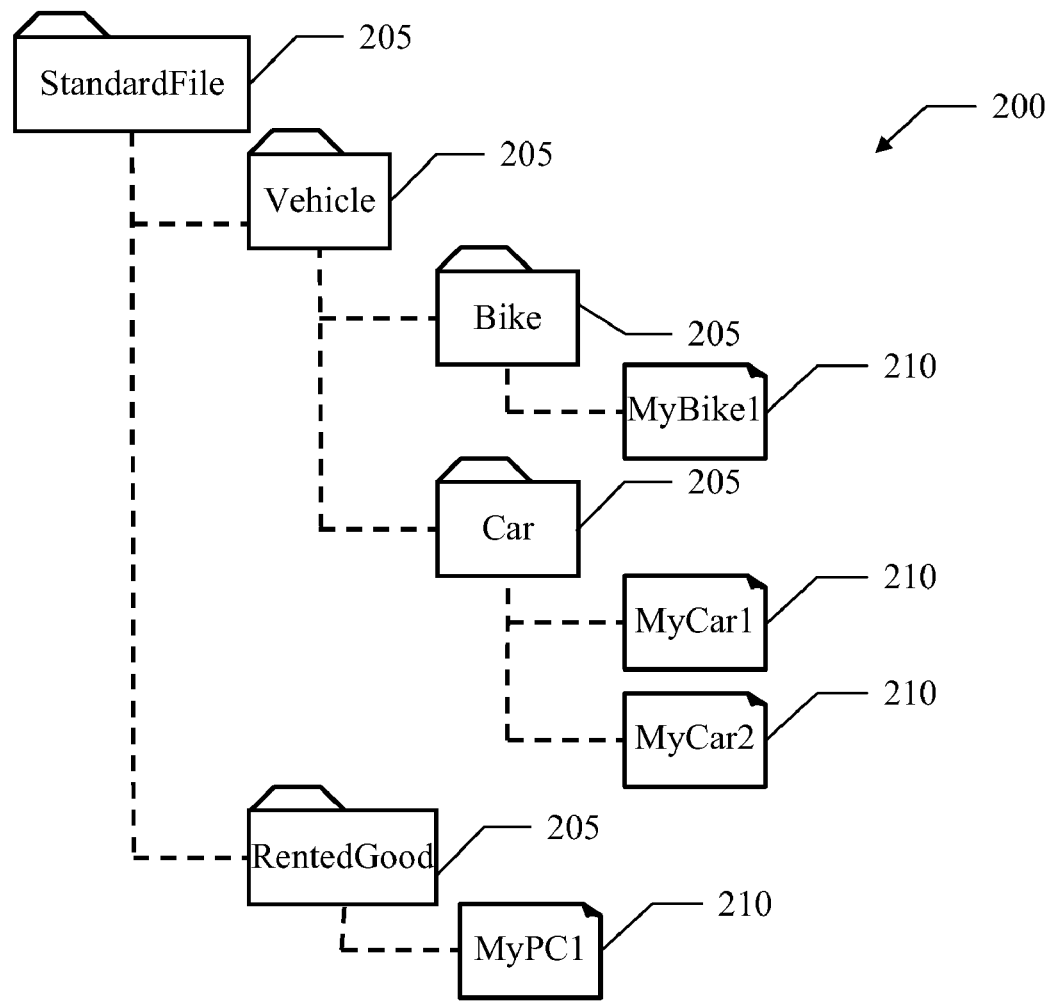

In the case of the weak deletion, as shown in FIG. 3D, only the corresponding assertion "MyCar2 is-a RentedGood" is removed from the knowledge base. This is represented in the tree 200 with the deletion of the virtual file "MyCar2" from the virtual folder "RentedGood". However, the operation does not affect the other terms of the knowledge base involving the instance "MyCar2". Therefore, in the example at issue the instance "MyCar2" of the concept "Car" (assertion "MyCar2 is-a Car") remains, as shown in the figure by the virtual file "MyCar2" that is still appended to the virtual folder "Car". For example, this operation may be performed when the corresponding car is not rented any longer, but it has been bought by the company.

Figure 3E:
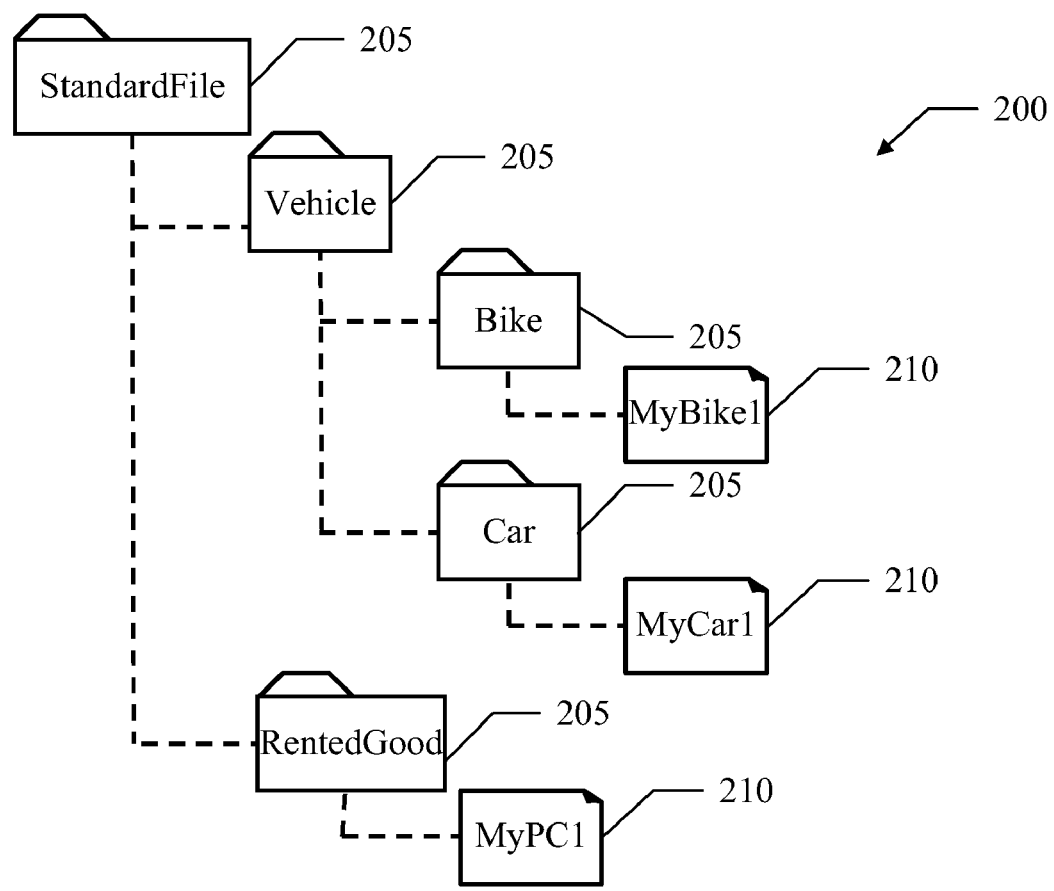

In the case of the strong deletion, as shown in FIG. 3E, the instance "MyCar2" is completely removed from the knowledge base with all the corresponding assertions. In the specific case at issue, this involves removing the instance "MyCar2", the assertion "MyCar2 is-a RentedGood", and the assertion "MyCar2 is-a Car". The removal of the instance "MyCar2" from the knowledge base also involves the actual cancellation of the corresponding real file from the mass memory of the computer. This is represented in the tree 200 with the deletion of the virtual files "MyCar2" from the virtual folder "RentedGood" and from the virtual folder "MyCar". For example, this operation may be performed when the company does not have the corresponding car any longer.

Moreover, it is possible to enforce any logical consistency of the characteristics of the files in the different virtual folders. For example, in prior filing systems, nothing prevents specifying in the metadata of a file storing a rock song that its author is (correctly) a rock band, but its genre is (wrongly) classical music.

Figure 4A:
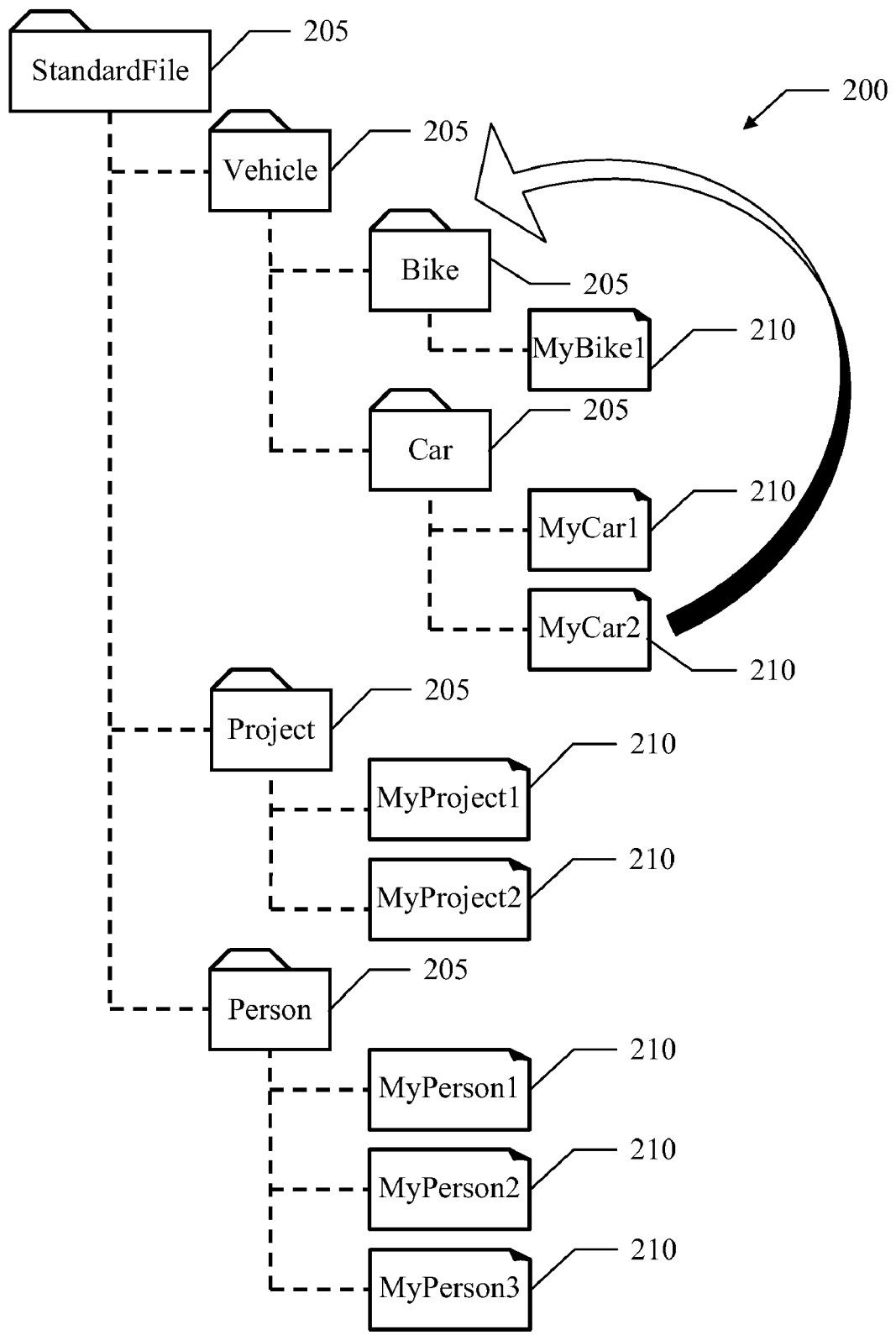
FIGS. 4A-4B show file structures according to an embodiment of the invention.
Figure 4B:
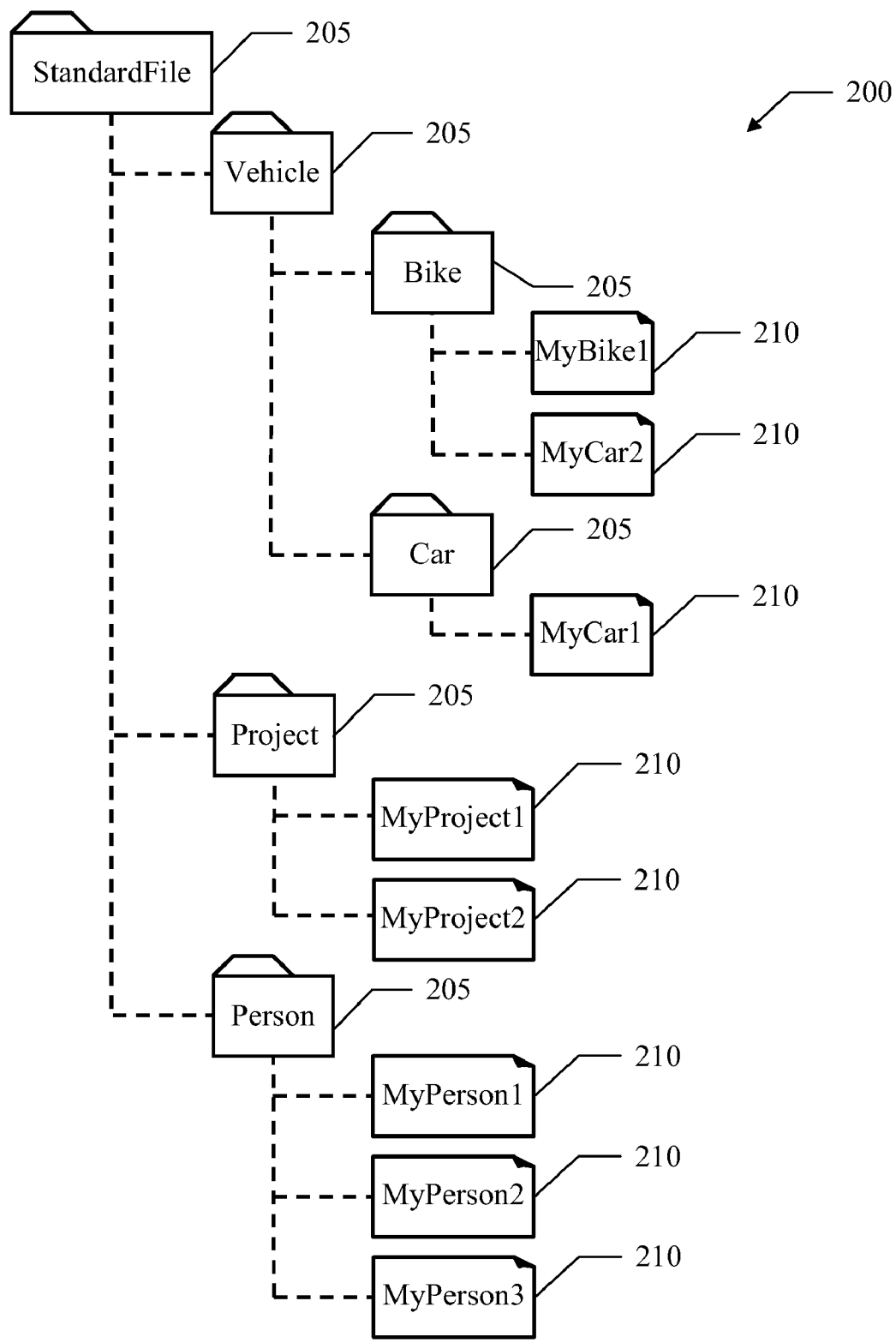

Some embodiments of the present invention enforce the logical consistency of any command that is submitted by the user on the virtual folders and/or files. FIGS. 4A-4B show file structures according to an embodiment of the invention. Referring to FIG. 4A, the user may try to copy the virtual file "MyCar2" into the virtual folder "Bike" (by drag-and-drop with the mouse, as represented by an arrow in the figure). However, the operation is incompatible with the assertion ("Car ∋Bike=Bottom") stating that no instances of the concept "Car" can also be an instance of the concept "Bike" (and vice-versa). Therefore, the user is warned that the operation is not allowed. In some implementations, the user can abort the operation in response to the warning (for example, because s/he understands that it was requested by mistake).

Moving to FIG. 4B, the user may be able to proceed in spite of the warning. For example, this may happen when the user understands that an error was made previously (e.g., the virtual file "MyCar2" was appended to the virtual folder "Car" by mistake). In this case, the instance "MyCar2" is included in the concept "Car" with the addition of a new assertion "MyCar2 is-a Bike" in the knowledge base. At the same time, all the assertions in the knowledge base that were incompatible with this new assertion are removed. In the specific case at issue, this involves removing the assertion "MyCar2 is-a Car". This change is represented in the tree 200 with the virtual file "MyCar2" that is moved from the virtual folder "Car" to the virtual folder "Bike". Thus, aspects of the invention ensure that the knowledge base is maintained in a logically consistent condition; particularly, the proposed feature prevents the user from performing any wrong operation on the file system.

Figure 5:
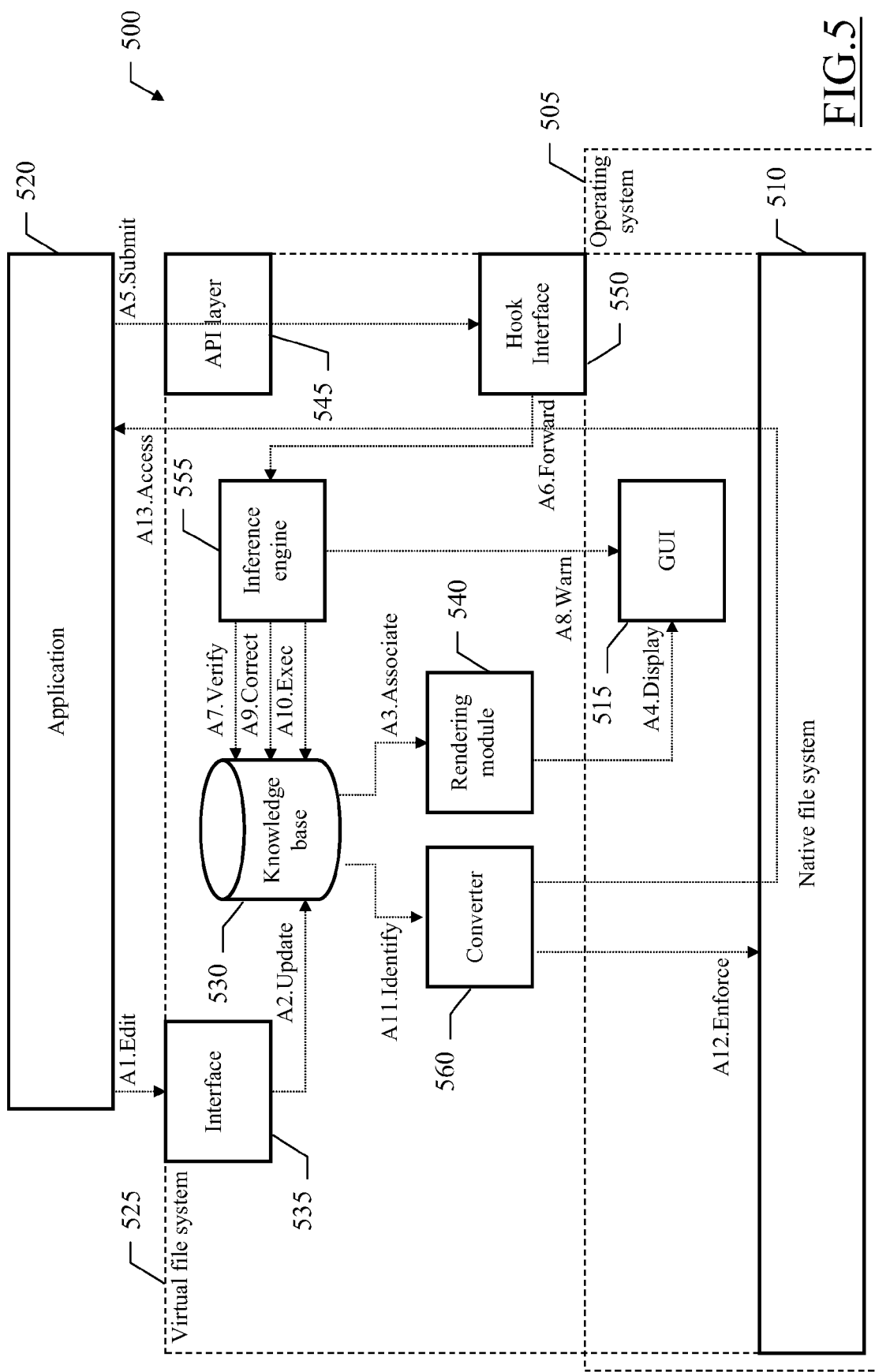
FIG. 5 is a collaboration diagram representing the roles of different software components for storing information in a data processing system according to an embodiment of the invention.

FIG. 5 is a collaboration diagram representing data flow and the roles of different software components for storing information in a data processing system according to an embodiment of the invention. Referring to FIG. 5, the main software components that can be used to implement an embodiment of the invention are denoted as a whole with the reference 500. The information (programs and data) is typically stored on the hard-disk and loaded (at least partially) into the working memory of the computer when the programs are running. The programs are initially installed onto the hard disk, for example, from CD-ROM. Particularly, the figure describes the static structure of the system via the corresponding components and its dynamic behavior via a series of exchanged messages, each one representing a corresponding action, denoted with sequence numbers preceded by the symbol "A".

An operating system 505 (for example, Linux) provides a software platform implementing the basic functions of the computer through corresponding components; particularly, the components of the operating system 505 that are relevant to the present discussion include a native file system manager 510 (which controls the organization of the real files on the mass memory of the computer) and a Graphical User Interface, or GUI 515 (which controls the interaction of the user with the computer through the manipulation of graphical elements). Software applications 520 run on top of the operating system 505. The application 520 may consist of either a software program implementing a specific service or a simple console for accessing the operating system 505 by the user.

In the solution according to an embodiment of the invention, a virtual file system manager 525 wraps the native file system manager 510. Particularly, the virtual file system manager 525 includes a knowledge base 530 (with its TBox and ABox, not shown in the figure), which describes the file system in conformity with a predefined ontology. The knowledge base may be stored on the mass memory of the computer in a structure that is independent of the real files (for example, in a database). In this way, the knowledge base 530 is de-coupled from the native file system manager 510 so that it can be used to extend any available native file system manager 510.

An interface 535 is used to edit the TBox of the knowledge base 530; for this purpose, the interface 535 exposes a set of APIs in corresponding libraries. These APIs allow submitting commands for adding, removing, or updating concepts, roles, attributes, and intensional assertions in the knowledge base 530 (action "A1.Edit"). In response thereto, the knowledge base 530 is updated accordingly in the respect of its logical consistency (action "A2.Update").

A rendering module 540 accesses the knowledge base 530. The rendering module 540 associates the concepts and instances of the knowledge base 530 with the corresponding virtual folders and files, which are then linked according to the corresponding assertions (action "A3.Associate"). The rendering module 540 then causes the GUI 515 to display a graphical representation of the resulting structure (action "A4.Display").

An API layer 545 exposes a set of APIs for managing the virtual folders and files (for example, implemented with a Java Extension). The API layer 545 supports all the commands of the native file system 510, with additional commands for the functions specific to the virtual file system 525. The application 520 can then submit any desired command to the virtual file system 525, by invoking the corresponding API exposed by the API layer 545 (action "A5.Submit"). For example, the commands may be submitted by acting on the graphical representation of the virtual folders and files. Alternatively, the commands may be submitted with corresponding instructions.

In any case, each command is intercepted by a hook interface 550 (for example, by exploiting a kernel extension of the operating system 505). In response thereto, the hook interface 550 forwards the command to an inference engine (or reasoner) 555 for the knowledge base 530 (action "A6.Forward"). Examples of available inference engines known in the art (for the knowledge base 530 expressed with the DL language) are Fact++, KAON, and Pellet. In response thereto, the inference engine 555 at first verifies whether the operation requested on the knowledge base 530 by the command is logically consistent with its content (action "A7.Verify"). When the result of this verification is negative, the inference engine 555 provides a warning message to the user through the GUI 515, such as, for example, with a pop-up window (action "A8.Warn"). If nevertheless the user decides to enforce the operation, the inference engine 555 corrects the knowledge base 530 to remove the inconsistency (action "A9.Correct"). In any case, the knowledge base 530 is then updated according to the required operation (action "A10.Exec"). When the execution of the operation involves any access and/or change to selected real files that are described by selected virtual files (either directly or through selected virtual folders), these real files are identified by a converter 560 according to their UUIDs (action A11.Identify"). If the operation consists of any change to the selected real files (such as their cancellation), the converter 560 enforces the operation on the native file system manager 510 (action "A12.Enforce"). Conversely, if the operation consists of an access to the selected real files (such as for their opening), the converter 560 returns the selected real file to the application 520 through the native file system manager 510 (action "A13.Access").

Naturally, in order to satisfy local and specific requirements, a person skilled in the art may apply to the solution described above many logical and/or physical modifications and alterations. More specifically, although embodiments of the present invention disclosed herein have been described with a certain degree of particularity, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part). In any case, the same solution may be used to organize any other type of files (for example, storing e-mails, multimedia data, and the like).

Moreover, the knowledge base may be defined in another way conforming to whatever ontology; in any case, the above-mentioned concepts, instances and relations are merely illustrative, and they must not be interpreted in a limitative manner. Other inference rules—or reasoning—may be used to derive further knowledge from the available one (for example, based on a higher-order logic).

The above-described examples of commands that may be submitted on the representation of the file system are not exhaustive. For example, similar considerations apply to a move command (i.e., a copy command and a delete command), and the like; moreover, the same commands (i.e., access, copy, move, delete, and so on) may also be applied mutatis mutandi to multiple virtual files, or to one or more virtual folders (for their application to all the virtual files appended thereto, either directly or indirectly).

Similar considerations apply if the consistency of the knowledge base is verified in any other way (for example, with the possibility of relaxing its requirements for non-critical environments and/or operations). Moreover, nothing prevents aborting the inconsistent operations (without the possibility for the user to force them); in this case, it may be necessary for the user to remove the inconsistency manually and then resubmit the same command.

The proposed graphical representation of the file system is not to be intended as a limitation. In any case, the same commands may also be submitted in any other way, even through a Command Line Interface (CLI).

Alternatively, it is possible to intercept the submission of each command to the file system manager with other techniques (for example, by wrapping the file system manager with stub libraries): in any case, nothing prevents implementing the proposed solution directly by the native file system manager. Naturally, the concepts may be organized in any other structure (even not based on a tree), such as a directed acyclic graph (DAG). The reference to the DL language must not be interpreted in a limitative manner, with the proposed solution that lends itself to be put into practice even expressing the knowledge base with other languages (such as the Prolog). Nothing prevents storing the knowledge base in any other form; for example, in a different embodiment of the invention (dependent on the underlying native file system manager), the corresponding information may be saved in metadata of real folders and files.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented with a hardware structure (for example, integrated in a chip of semiconductor material), or with a combination of software and hardware. It would be readily apparent that it is also possible to deploy the same solution as a service that is accessed through a network (such as the Internet).

In an embodiment of the invention, the virtual file system may be implemented directly at the level of the operating system. However, nothing prevents providing the same solution as a plug-in, or in any other form. Moreover, although the proposed solution has been described above only with reference to a stand-alone file system, it may also be implemented in a distributed file system. It is also possible to integrate different file systems (on remote computers) at the semantic level, with a process of reconciliation based on a common ontology to which all of them commit.

The proposed method may be carried out on a system having a different architecture or including equivalent units (for example, based on a local network). Moreover, each computer may include similar elements (such as cache memories temporarily storing the programs or parts thereof). In any case, it is possible to replace the computer with any code execution entity (such as a PDA, a mobile phone, and the like), or with a combination thereof (such as a multi-tier server architecture, a grid computing infrastructure, and the like).

It should be understood that the inventive concepts disclosed herein are capable of many modifications. To the extent such modifications fall within the scope of the appended claims and their equivalents, they are intended to be covered by this patent.

What is claimed is:

1. A method for storing information in a data processing system, the method comprising:
providing a knowledge base for a file system manager, the file system manager being adapted to organize a plurality of real files on a mass memory of the data processing system and the knowledge base defining knowledge comprising a set of concepts, a set of relations among the concepts, and a set of relations of inclusion describing each real file individually as an instance of at least one concept according to a predefined ontology;
detecting a command for the file system manager for accessing a set of selected instances;
identifying a set of selected real files described by the selected instances according to the knowledge;
accessing the selected real files on the mass memory;
incorporating at least one additional concept into the set of concepts;
applying at least one predefined logical inference rule to the at least one additional concept to identify one or more implicit relations between the at least one additional concept and one or more real files stored on the mass memory, the application of the at least one predefined logical inference rule resulting in an expansion of the knowledge base to include further knowledge, the further knowledge comprising the at least one additional concept, at least one relation between the at least one additional concept and one or more concepts in the set of concepts, and at least one relation of inclusion that additionally describes the one or more real files as instances of the at least one additional concept;
identifying a further set of selected files according to the further knowledge;
accessing the further selected files on the mass memory;
detecting a further command for the file system manager for manipulating a set of further selected instances;
determining whether an update to the knowledge according to the further command is logically consistent with each relation in the set of relations among the concepts;
on the condition that the update is logically consistent with the set of relations among the concepts, updating the knowledge according to the further command; and
on the condition that the update is logically inconsistent with at least one relation in the set of relations among the concepts, providing a warning to a user of the file system manager of the logical inconsistency and providing the user with a capability to perform at least one of the following actions:
aborting the update to the knowledge in response to the warning, and
overriding the warning and proceeding with the update to the knowledge, the update further comprising removing each relation in the set of relations among the concepts that is logically inconsistent with the update.

2. The method of claim 1 wherein:
the further command is configured to add the further selected instances to a target concept; and
updating the knowledge according to the further command comprises individually asserting a relation of inclusion of each further selected instance in the target concept.

3. The method of claim 1 wherein:
the further command is configured to weakly delete the further selected instances from a target concept;
updating the knowledge according to the further command comprises:
removing a relation of inclusion of each further selected instance from the target concept, and
maintaining, for each further selected instance, each relation of inclusion that exists with a concept in the set of concepts other than the target concept; and
the method further comprises maintaining each real file described by each further selected instance.

4. The method of claim 1 further comprising:
identifying a set of further selected real files being described by the further selected instances according to the knowledge; and
changing the further selected real files according to the further command.

5. The method of claim 4 wherein:
the further command is configured to strongly delete the further selected instances from a target concept; and
updating the knowledge according to the further command comprises:
deleting the further selected instances, and
removing, for each further selected instance, each relation of inclusion that exists with each concept in the set of concepts;
the method further comprising deleting from the mass memory each real file described by each further selected instance.

6. The method of claim 1 further comprising:
on the condition that the update is logically inconsistent with at least one relation in the set of relations among the concepts, providing a warning to a user of the file system manager of the logical inconsistency and preventing the update to the knowledge.

7. The method of claim 1 further comprising:
associating a virtual folder with each concept individually and a virtual file with each instance individually; and
displaying a representation of, the file system including the virtual folders and the virtual files organized according to at least one of the relations, the command, and the further command.

8. The method of claim 1 wherein detecting the further command comprises:
intercepting the further command; and
forwarding the further command to an inference engine for the knowledge base.

9. The method of claim 1 wherein detecting the command comprises:
intercepting the command; and
forwarding the command to an inference engine for the knowledge base.

10. The method of claim 1 wherein the concepts conform to a hierarchical taxonomy, the concepts being organized by the relations in a tree starting from a root one of the concepts for all the real files.

11. The method of claim 1 wherein the knowledge base is stored in a mass memory structure that is independent of the real files.

12. A system for storing information in a data processing system, the system comprising:
a processor; and
a computer memory operatively coupled to the processor; wherein the computer memory has disposed within it:
computer program instructions for providing a knowledge base for a file system manager, the file system manager being adapted to organize a plurality of real files on a mass memory of the data processing system and the knowledge base defining knowledge comprising a set of concepts, a set of relations among the concepts, and a set of relations of inclusion describing each real file individually as an instance of at least one concept according to a predefined ontology;
computer program instructions for detecting a command for the file system manager for accessing a set of selected instances;
computer program instructions for identifying a set of selected real files described by the selected instances according to the knowledge; and
computer program instructions for accessing the selected real files on the mass memory;
computer program instructions for incorporating at least one additional concept into the set of concepts;
computer program instructions for applying at least one predefined logical inference rule to the at least one additional concept to identify one or more implicit relations between the at least one additional concept and one or more real files stored on the mass memory, the application of the at least one predefined logical inference rule resulting in an expansion of the knowledge base to include further knowledge, the further knowledge comprising the at least one additional concept, at least one relation between the at least one additional concept and one or more concepts in the set of concepts, and at least one relation of inclusion that additionally describes the one or more real files as instances of the at least one additional concept;
computer program instructions for identifying a further set of selected files according to the further knowledge;
computer program instructions for accessing the further selected files on the mass memory
computer program instructions for detecting a further command for the file system manager for manipulating a set of further selected instances;
computer program instructions for determining whether an update to the knowledge according to the further command is logically consistent with each relation in the set of relations among the concepts;
on the condition that the update is logically consistent with each relation in the set of relations among the concepts, computer program instructions for updating the knowledge according to the further command; and
on the condition that the update is logically inconsistent with at least one relation in the set of relations among the concepts, computer program instructions for providing a warning to a user of the file system manager of the logical inconsistency and for providing the user with a capability to perform at least one of the following actions:
aborting the update to the knowledge in response to the warning, and
overriding the warning and proceeding with the update to the knowledge, the update further comprising removing each relation in the set of relations among the concepts that is logically inconsistent with the update.

13. The system of claim 12, wherein:
on the condition that the further command is configured to weakly delete the further selected instances from a target concept, the computer program instructions for updating the knowledge according to the further command comprise:
computer program instructions for removing a relation of inclusion of each further selected instance from the target concept, and
computer program instructions for maintaining, for each further selected instance, each relation of inclusion that exists with a concept in the set of concepts other than the target concept; and
the system further comprises computer program instructions for maintaining each real file described by each further selected instance; and
on the condition that the further command is configured to strongly delete the further selected instances from a target concept, the computer program instructions for updating the knowledge according to the further command comprise:
computer program instructions for deleting the further selected instances, and
computer program instructions for removing, for each further selected instance, each relation of inclusion that exists with each concept in the set of concepts; and
the system further comprises computer program instructions for deleting from the mass memory each real file described by each further selected instance.

14. A computer program product disposed upon a computer-readable medium for storing information in a data processing system, the computer program product comprising:
computer program instructions for providing a knowledge base for a file system manager, the file system manager being adapted to organize a plurality of real files on a mass memory of the data processing system and the knowledge base defining knowledge comprising a set of concepts, a set of relations among the concepts, and a set of relations of inclusion describing each real file individually as an instance of at least one concept according to a predefined ontology;
computer program instructions for detecting a command for the file system manager for accessing a set of selected instances;
computer program instructions for identifying a set of selected real files described by the selected instances according to the knowledge;
computer program instructions for accessing the selected real files on the mass memory;
computer program instructions for incorporating at least one additional concept into the set of concepts;
computer program instructions for applying at least one predefined logical inference rule to the at least one additional concept to identify one or more implicit relations between the at least one additional concept and one or more real files stored on the mass memory, the application of the at least one predefined logical inference rule resulting in an expansion of the knowledge base to include further knowledge, the further knowledge comprising the at least one additional concept, at least one relation between the at least one additional concept and one or more concepts in the set of concepts, and at least one relation of inclusion that additionally describes the one or more real files as instances of the at least one additional concept;
computer program instructions for identifying a further set of selected files according to the further knowledge;
computer program instructions for accessing the further selected files on the mass memory;
computer program instructions for detecting a further command for the file system manager for manipulating a set of further selected instances;
computer program instructions for determining whether an update to the knowledge according to the further command is logically consistent with each relation in the set of relations among the concepts;
on the condition that the update to the knowledge is logically consistent with each relation in the set of relations among the concepts, computer program instructions for updating the knowledge according to the further command; and
on the condition that the update is logically inconsistent with at least one relation in the set of relations among the concepts, computer program instructions for providing a warning to a user of the file system manager of the logical inconsistency and for providing the user with a capability to perform at least one of the following actions:
aborting the update to the knowledge in response to the warning, and
overriding the warning and proceeding with the update to the knowledge, the update further comprising removing each relation in the set of relations among the concepts that is logically inconsistent with the update.

15. The computer program product of claim 14, wherein:
on the condition that the further command is configured to weakly delete the further selected instances from a target concept, the computer program instructions for updating the knowledge according to the further command comprise:
computer program instructions for removing a relation of inclusion of each further selected instance from the target concept, and
computer program instructions for maintaining, for each further selected instance, each relation of inclusion that exists with a concept in the set of concepts other than the target concept; and
the system further comprises computer program instructions for maintaining each real file described by each further selected instance; and
on the condition that the further is configured to strongly delete the further selected instances from a target concept, the computer program instructions for updating the knowledge according to the further command comprise:
computer program instructions for deleting the further selected instances, and
computer program instructions for removing, for each further selected instance, each relation of inclusion that exists with each concept in the set of concepts; and
the system further comprises computer program instructions for deleting from the mass memory each real file described by each further selected instance.

* * * * *